United States Patent
Leonhardt (10) Patent No.: US 10,938,486 B2
(45) Date of Patent: Mar. 2, 2021

(54) OPTICAL BUS FOR A MULTI-CORE PROCESSOR

(71) Applicant: YEDA RESEARCH AND DEVELOPMENT CO. LTD., Rehovot (IL)

(72) Inventor: Ulf Leonhardt, Yarkona (IL)

(73) Assignee: YEDA RESEARCH AND DEVELOPMENT CO. LTD., Rehovot (IL)

(*) Notice: Subject to any disclaimer, the term of this patent is extended or adjusted under 35 U.S.C. 154(b) by 0 days.

(21) Appl. No.: 16/643,862

(22) PCT Filed: Aug. 20, 2018

(86) PCT No.: PCT/IL2018/050921
§ 371 (c)(1),
(2) Date: Mar. 3, 2020

(87) PCT Pub. No.: WO2019/043689
PCT Pub. Date: Mar. 7, 2019

(65) Prior Publication Data
US 2020/0382221 A1    Dec. 3, 2020

(30) Foreign Application Priority Data

Sep. 3, 2017  (IL) .......................................... 254295

(51) Int. Cl.
*H04B 10/80*  (2013.01)
*G02B 6/43*  (2006.01)
*H04B 10/25*  (2013.01)

(52) U.S. Cl.
CPC .............. *H04B 10/801* (2013.01); *G02B 6/43* (2013.01); *H04B 10/25* (2013.01)

(58) Field of Classification Search
CPC .......... H04B 10/801; H04B 10/25; G02B 6/43
See application file for complete search history.

(56) References Cited

U.S. PATENT DOCUMENTS

| | | |
|---|---|---|
| 4,848,882 A | 7/1989 | Suzuki et al. |
| 5,268,973 A | 12/1993 | Jenevein |
| 6,410,940 B1 | 6/2002 | Jiang et al. |
| 8,731,017 B2 | 5/2014 | Clifton et al. |
| 9,581,797 B2 | 2/2017 | Acosta et al. |

(Continued)

FOREIGN PATENT DOCUMENTS

| | | |
|---|---|---|
| EP | 0477036 A2 | 3/1992 |
| WO | WO 2011/036469 A1 | 3/2011 |

OTHER PUBLICATIONS

Cardenas et al. "Low loss etchless silicon photonic waveguides" Optics express. Mar. 16, 2009;17(6):4752-7.

(Continued)

*Primary Examiner* — Leslie C Pascal
(74) *Attorney, Agent, or Firm* — Mark S. Cohen; Pearl Cohen Zedek Latzer Baratz LLP (57) ABSTRACT

An optical bus for multi-core processing providing optical data transfer between cores through a single planar waveguide employing a variable-thickness, light-propagation layer having a progressively changing effective refractive index in accordance with lateral position within the light-propagation layer such that light emission from a single light emitter in communication with one core is focused on each of multiple photodetectors in communication with its respective processer core.

13 Claims, 5 Drawing Sheets

(56) References Cited

U.S. PATENT DOCUMENTS

2003/0044118 A1   3/2003   Zhou et al.
2012/0304143 A1   11/2012  Saida et al.
2012/0312969 A1   12/2012  Leonhardt et al.
2013/0183015 A1   7/2013   Mod et al.

OTHER PUBLICATIONS

Di Falco et al. "Luneburg lens in silicon photonics" Optics express. Mar. 14, 2011;19(6):5156-62.
International Search Report for PCT Application No. PCT/IL2018/050921 dated Nov. 6, 2019.
Leonhardt U. "Optical conformal mapping. Science" Jun. 23, 2006;312(5781):1777-80.
Leonhardt U. "Perfect imaging without negative refraction" New Journal of Physics. Sep. 29, 2009;11(9):093040.
Mikaelian et al. "V self-focusing media with variable index of refraction" In Progress in optics Jan. 1, 1980 (vol. 17, pp. 279-345). Elsevier.

OPTICAL BUS FOR A MULTI-CORE PROCESSOR

BACKGROUND OF THE INVENTION

Advances in modern computer processors have run into a barrier. Extracting additional computing power requires integration of multiple cores to overcome clock speed that have remained relatively unchanged for years. However, efficient communication between multiple cores presents another barrier to extracting additional computing power.

Current bus-based interconnects are limited to 10-20 cores. Prototype processors (MIT Raw, Tilera, Intel Terascale Prototype) employ nearly 100 cores interconnected through wire networks and are limited to inter-core communicate between neighboring cores only. Furthermore, the wire networks consume precious space and energy in addition to generating excess heat.

The alternative to wire core-to-core communication is optical communication implemented through fiber optics enabling each core to emit and receive light pulses and all cores receive the same information. Selective communication can be achieved by sending information with light of different frequencies.

Fiber optic technology also suffers from limited transmission capacity emanating from the one-dimensional nature of fiber optic data transmission. As computers move towards integration of 100 plus core processing, fiber optic technology will be unable to provide such robust inter-core data transmission capacity.

Therefore, there is a need for optical transmission technology providing data transmission for processors employing hundreds of optically linked cores.

SUMMARY OF THE INVENTION

According to the teachings of the present invention there is provided an optical bus for a multi-core processor including a planar waveguide providing substantially total internal reflection within a variable-thickness, light-propagation layer sandwiched between two non-propagation layers, the light-propagation layer having a progressively changing effective refractive index in accordance with lateral position within the light-propagation layer; a set of illumination ports embedded in the waveguide, the ports distributed so as to focus illumination emanating from any light port of the set onto a plurality of remaining ports of the set; and a light management system configured to selectively activate one or more illumination ports of the set as light emitters and simultaneously activate remaining illumination ports of the set as light receivers.

According to a further feature of the present invention, the light propagation layer is split by a non-propagation layer.

According to a further feature of the present invention, the plurality of illumination ports is embedded in a non-light propagation layer of the planar waveguide.

According to a further feature of the present invention, the light management system is implemented in at least one core linked by the optical bus.

According to a further feature of the present invention, the illumination is implemented at a wavelength within an infrared region of the electromagnetic spectrum.

According to a further feature of the present invention, each of the two non-propagating layers has a different index of refraction from each other.

According to a further feature of the present invention, there is also provided a peripheral reflector disposed on the planar wave guide.

According to a further feature of the present invention, the peripheral reflector is implemented as a Bragg reflector.

There is also provided according to the teachings of the present invention, a method of optically transferring data between multiple cores of a processor, the method including emitting light from an emitter embedded in a planar waveguide, the emitter in communication with a first processor core; directing the light through a variable-thickness, light-propagation layer sandwiched between two non-propagation layers of the planar waveguide, the light-propagation layer having a progressively changing effective refractive index in accordance with lateral position within the light-propagation layer;

focusing the light onto a plurality of photodetectors embedded in the planar waveguide; each of the plurality of photodetectors in communication with separate processor cores.

According to a further feature of the present invention, the focusing the light includes reflecting from a reflector.

According to a further feature of the present invention, the reflector is implemented as Bragg reflector.

According to a further feature of the present invention, the emitter is implemented as a dual-function illumination port.

According to a further feature of the present invention, the photodetectors are implemented as a dual-function illumination port.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that device elements may not be drawn to scale for the sake of emphasizing elements and reference numerals may be repeated among the figures to indicate corresponding or analogous elements.

DETAILED DESCRIPTION OF THE PRESENT INVENTION

In the following description, numerous details are set forth to provide a thorough understanding of the invention.

However, it will be understood by those skilled in the art that the present invention may be practiced without these specific details. Common knowledge methods, procedures, and components are omitted to highlight the inventive features and steps.

The present invention is generally directed to optical data communication, and specifically, is directed to scaling up the number of cores that can be effectively employed in a single processor to increase computing power by improving inter-core communication through an optical bus implemented as a planar waveguide. The optical bus advantageously leverages spatial selectivity to optically link thousands of optical emitters and receivers on each core. Consequently, the number of transmission channels available in the bus is limited by the area available in the focusing region of the propagation layer of the waveguide to receive illumination ports.

The following terms will be used throughout this document.

"Illumination port" or "port" refers to dual function micro-diode that can be activated as either a Light Emitting Diode (LED) or photodiode depending on the direction of a voltaic bias applied as is known in the art. The term "photodetector" refers to a "photodiode".

"Port set" refers to a set of illumination ports disposed at focal points of the propagation layer.

"Focusing region" refers to a region in the propagation layer satisfying the condition in which multiple light rays emitted at any point in this region are focused at corresponding points within the focusing region. The geometry of the thickness profile in which this condition is satisfied is a function of the embodiment, several non-limiting embodiments as set forth herewithin.

As noted above, the optical bus is implemented as a planar waveguide and is constructed from alternating of layers of relatively high and low refractive-index materials in which the low index materials sandwich the higher index material. Without diminishing in scope, this document will discuss embodiments employing a silica-silicon-silica sandwich.

As is known in the art, light propagation through such a waveguide is confined to the high-index layer through total internal refraction and is therefore deemed the propagation layer and the silica layers are deemed to be the non-propagation layers.

Figure 1:
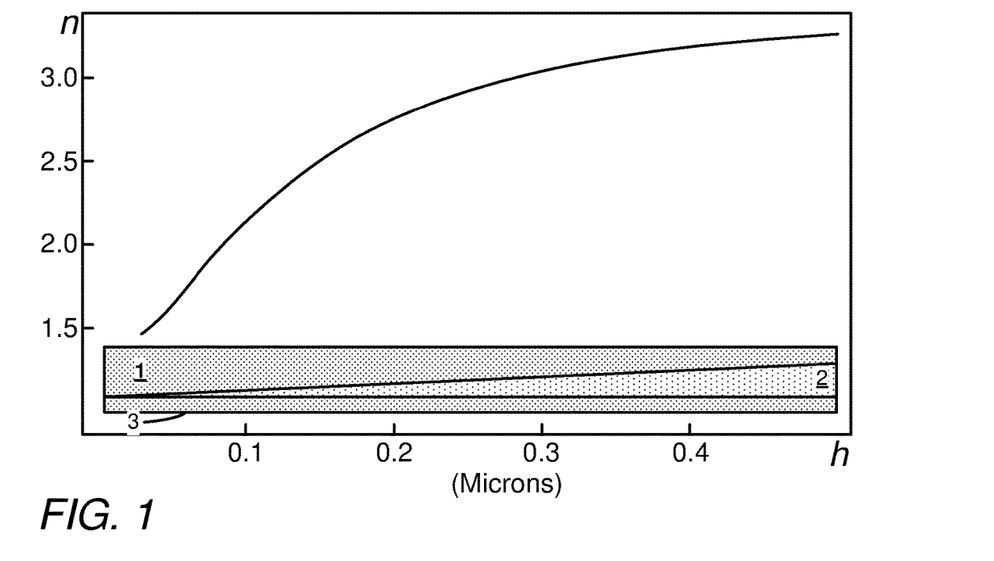
FIG. 1 is a combined graphic and schematic depiction of effective refractive index as a function of height of the propagation layer of the planar wavelength, according to an embodiment.

The propagation layer of the instant planar waveguide exhibits a variable effective refractive-index n that changes as a function of height h or thickness of the silicon propagation layer, which is depicted schematically and graphically in FIG. 1. The effective refractive-index n of the silicon propagation layer is shown for light having a free space wavelength $\lambda=155$ µm and assumes an infinite thickness of the silica layers. (Such an assumption is justifiable because the electromagnetic field is exponentially decreasing as a function of silica thickness.)

The effective refractive-index n is obtained by solving for the ground state of the Helmholtz equation for the polarization with electric field orthogonal to the propagation layer. Standard Sellmeier equations are used for the individual refractive indices of silica (glass), $n_g$, and silicon $n_s$, respectively. The effective refractive-index n of a sandwich of silica, silicon, silica where the silicon propagation layer has variable height h in µm is given by the following mathematical procedure in which the electric field in the various layers is set forth as Equation (1)

$$E_1 a_1 \exp(\sqrt{\beta^2 - n_g^2 k^2} z) \text{ in lower silica layer } 1,$$

$$E_2 = \cos(\sqrt{n_s^2 k^2 z - \beta^2} z) + a_2 \sin(\sqrt{n_s^2 k^2 z - \beta^2} z) \text{ in silicon layer, 2, and}$$

$$E_3 = \exp(-\sqrt{\beta^2 - n_g^2 k^2} z) \text{ in upper silica layer, 3;}$$

where $k=2\pi/\lambda$ for light with free-space wavelength $\lambda$. Require $E_1=E_2$, $\partial E_1/\partial z = \partial E_2/\partial z$ at $z=-h/2$ and $E_2=E_3$, $\partial E_2/\partial z = \partial E_3/\partial z$ at $z=h/2$, and solve numerically with a computing device for $a_m$ and $\beta$. The effective refractive-index is the given by $n=\beta/k$. The function $n(h)$ in FIG. 1 is numerically inverted to give $h(n)$.

Figure 2:
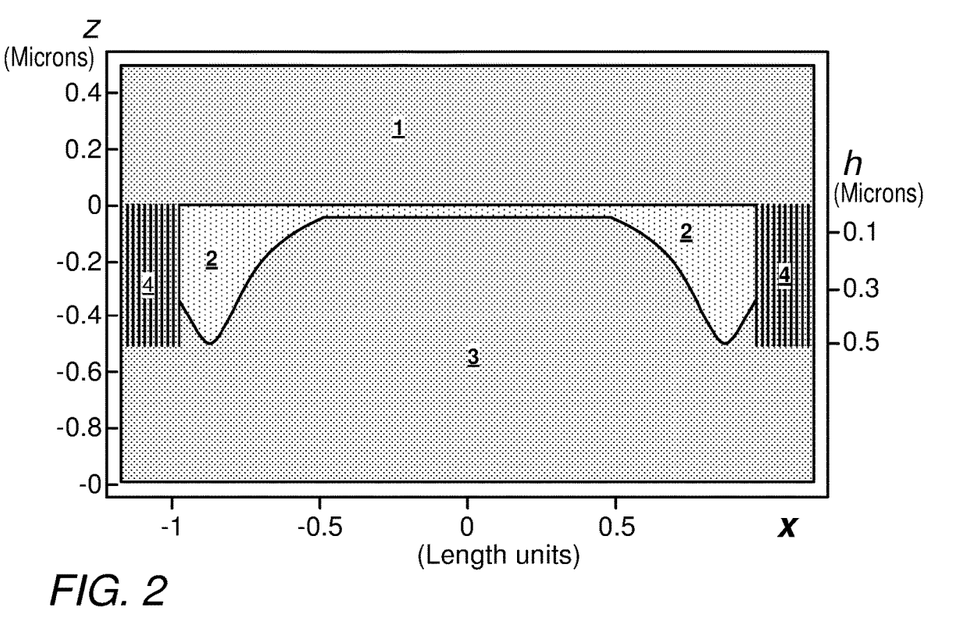
FIG. 2 is a schematic cross-sectional view of the optical bus; according to an embodiment.

FIG. 2 depicts a cross-sectional view of an embodiment of an optical bus having light-propagation layer 2, lower and upper non-propagation layers 1 and 3, respectively and a Bragg mirror 4 surrounding the propagation layer 2 and a portion of lower non-propagation layer 3. As shown, light-propagation layer 2 is rotationally symmetric and has a varying height h in microns defining an effective refractive profile in accordance with Cartesian coordinates x and y identifying lateral position on the propagation layer. This view is shown for a cut at y=0 along the diameter of the device and it should be appreciated that height units are different than the lateral length units (x and y); the height relative to the depicted length is exaggerated for the sake of clarity.

The effective index profile is designed to enable light emission at one point in the optical bus to be focused at multiple, exclusive partner points, thereby advantageously enabling reliable information transfer through encoded light when deployed.

This index profile is generated in accordance with Equation (2):

$$n = n_0 \frac{2 r^{\frac{m}{2}-1}}{1 + r^m}$$

where the radius $r=\sqrt{x^2+y^2}$ is given in units of the radius of the device, m denotes the number of optically connected light ports and no is an arbitrary constant pre-factor. As shown in FIG. 2, the profile generated from Equation (2) flattens out in the locations in which the refractive index drops from its maximal value by a factor of two, in a certain embodiment. The pre-factor is chosen such that this range of n lies within the range of refractive index depicted in FIG. 1.

Equation (2) is obtained from the index profile of Maxwell's fish eye through optical conformal mapping with a power-law conformal transformation in accordance with the article "Optical Conformal Mapping" and "Maxwell's Fish Eye" by U. Leonhardt, Science 312, 1777 (2006) and U. Leonhardt, New J. Phys. 11, 093040 (2009). Both articles are hereby incorporated by reference in their entirety. The power-law conformal transformation is described by the analytic function $w=z^{m/2}$ of $z=x+iy$.

Figure 3:
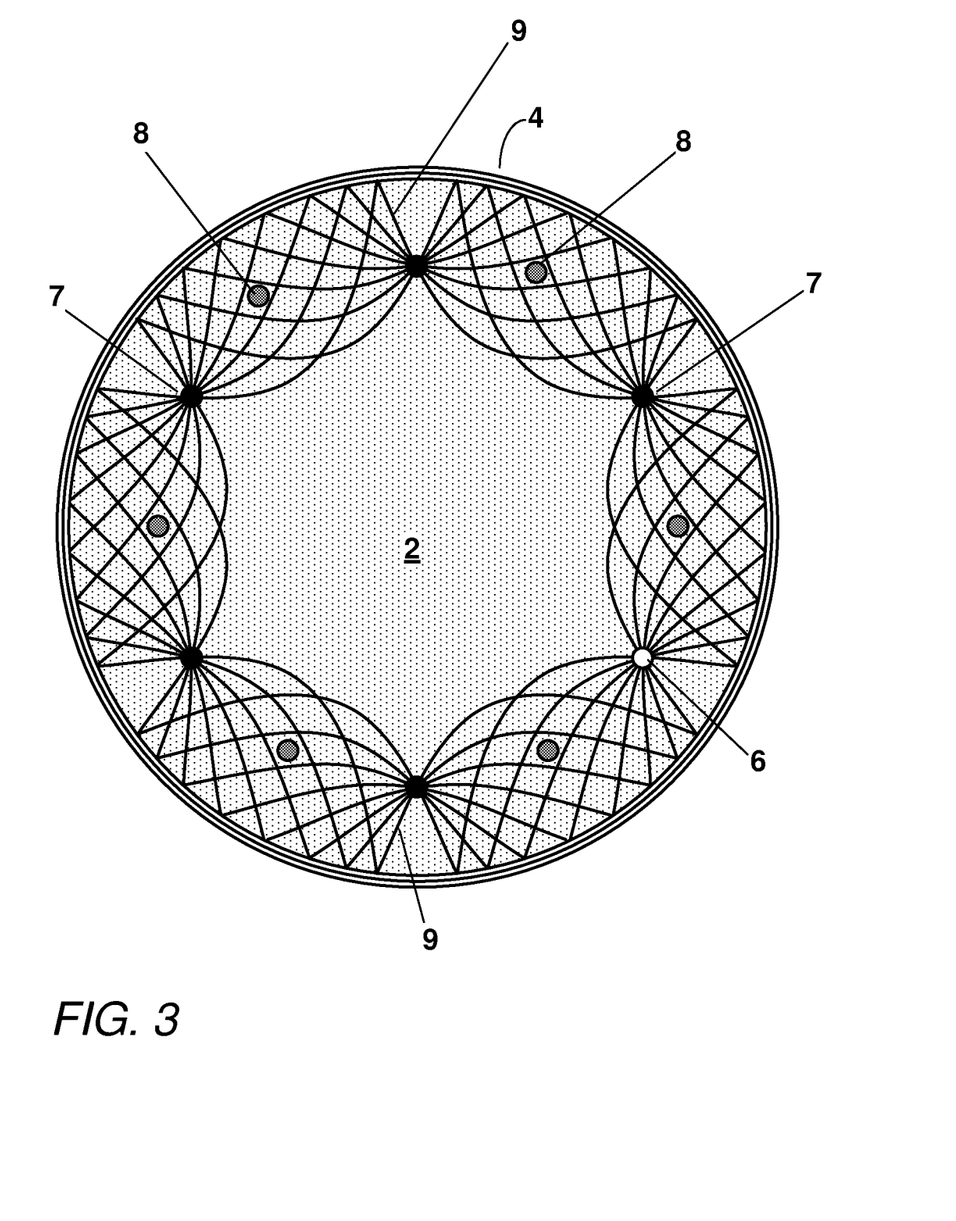
FIG. 3 is a schematic top view of a propagation layer of the optical bus depicting light propagation from a divergence point to convergence at multiple focal points for a circular embodiment of the optical bus.

FIG. 3 is a schematic, top view of light propagation in propagation layer 2 of a circular optical bus, having, an active set of focal points and a selectable light emission point 6 and receiving focal points 7 plus inactive focal points 8, and a circumferential Bragg mirror 4, according to an embodiment.

In operation, the effective refractive index defined by the thickness profile depicted in FIG. 2 causes light propagation to follow specific propagation paths 9 having a unique and exclusive set of focal points. Light emitted at any one of these focal points propagates as shown and converges at each of the partner focal points of the focal point set without converging at focal points associated with inactive focal point sets for emission point 6. It should be appreciated that in operation multiple sets of focal points are employed simultaneously and each light emission is confined to its respective set of focal points.

Shown is an example of light divergence at its emission point 6, travel along propagation path 9, and convergence at multiple focal points 7 without converging at focal points 8 associated with other focal point sets.

Ray tracing in propagation layer 2 is achieved through numerically solving Hamilton's equations for the position vector r and wave vector k of the light rays in Equation (3):

$$\frac{dr}{dt} = \frac{\partial \omega}{\partial k}, \frac{dk}{dt} = -\frac{\partial \omega}{\partial r}, \text{ with } \omega = \frac{k}{n}$$

Light generally refers to infrared light because of its outstanding propagation properties in silicon; however, various other wavelengths useful in such applications can also be employed.

Bragg mirror 4 is configured to ensure that light emission escaping the propagation layer 2 is reflected to ensure complete internal reflection in accordance with the propagation path discussed above and depicted in FIG. 3.

Figure 4:
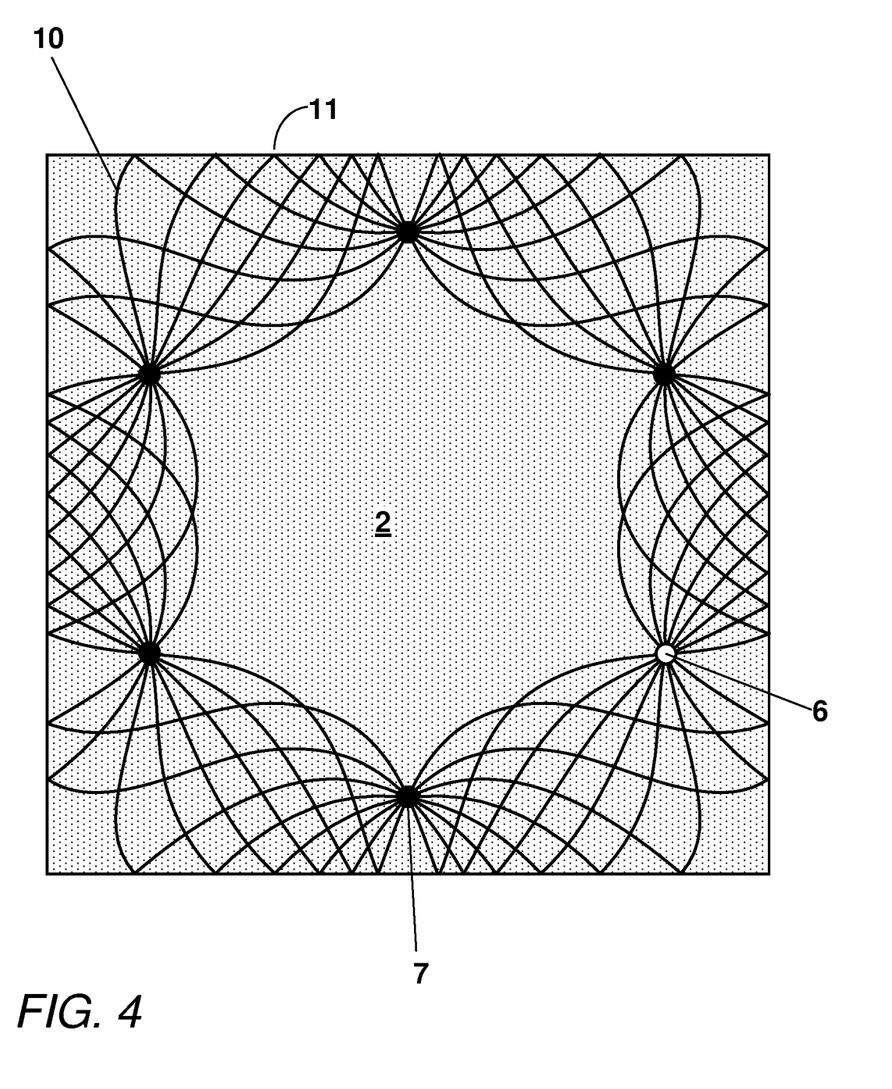
FIG. 4 is a schematic top view of a propagation layer of the optical bus depicting light propagation from a divergence point to convergence at multiple focal points for a square embodiment of the optical bus.

FIG. 4 is a schematic, top view of light propagation in propagation layer 2 implemented in a rectangular optical bus for applications requiring such bus geometry to match the geometry of computer processors or the geometry of the core layout.

Analogously to the circular embodiment of FIG. 3, this embodiment also has an active set of focal points having a selectable emission point 6 and receiving focal points 7, plus an inactive set of focal points (not shown), and a circumferential mirror 11, according to an embodiment.

In operation, the effective refractive index defined by the thickness profile causes light propagation to follow propagation path 10 having a unique and exclusive set of focal points different that the path depicted in the circular embodiment of FIG. 3.

The necessary effective refractive index is implemented, here too, through the thickness profile of propagation layer 2 as set forth above through Equation (1). The effective refractive index profile for this rectangular embodiment is derived through conformal transformation of Equation (2) of the circular embodiment depicted in FIG. 3 to maintain light propagation functionality.

The conformal transformations can be implemented by refractive index profiles calculated in accordance with the above-noted article "Optical Conformal Mapping" in Science 312, 1777 (2006). Specifically, the transformation of a unit disk to a unit square is given by Equation (4):

$$z = (i-1)\left(\frac{F\left(arcos(\sqrt{i}\,w), \frac{1}{2}\right)}{K\left(\frac{1}{2}\right)} - 1\right)$$

where w=u+iv are re-named Cartesian coordinates of the plane of FIG. 3 in complex notation (and in units of the radius) and z=x+iy are the corresponding Cartesian coordinates of FIG. 4 in units of a processor size; F is the elliptical integral of the first kind and K is the complete elliptical integral of the first kind.

The transformed effective refractive index profile n' is given, in terms of the original profile n and the conformal transformation, by the Equation (5)

$$n' = n\left|\frac{dw}{dz}\right|$$

where n should be taken as a function of w(z) and w*(z*), and the conformal transformation is represented by the analytic function w(z) on the complex plane; the inverse of z(w).

Figure 5:
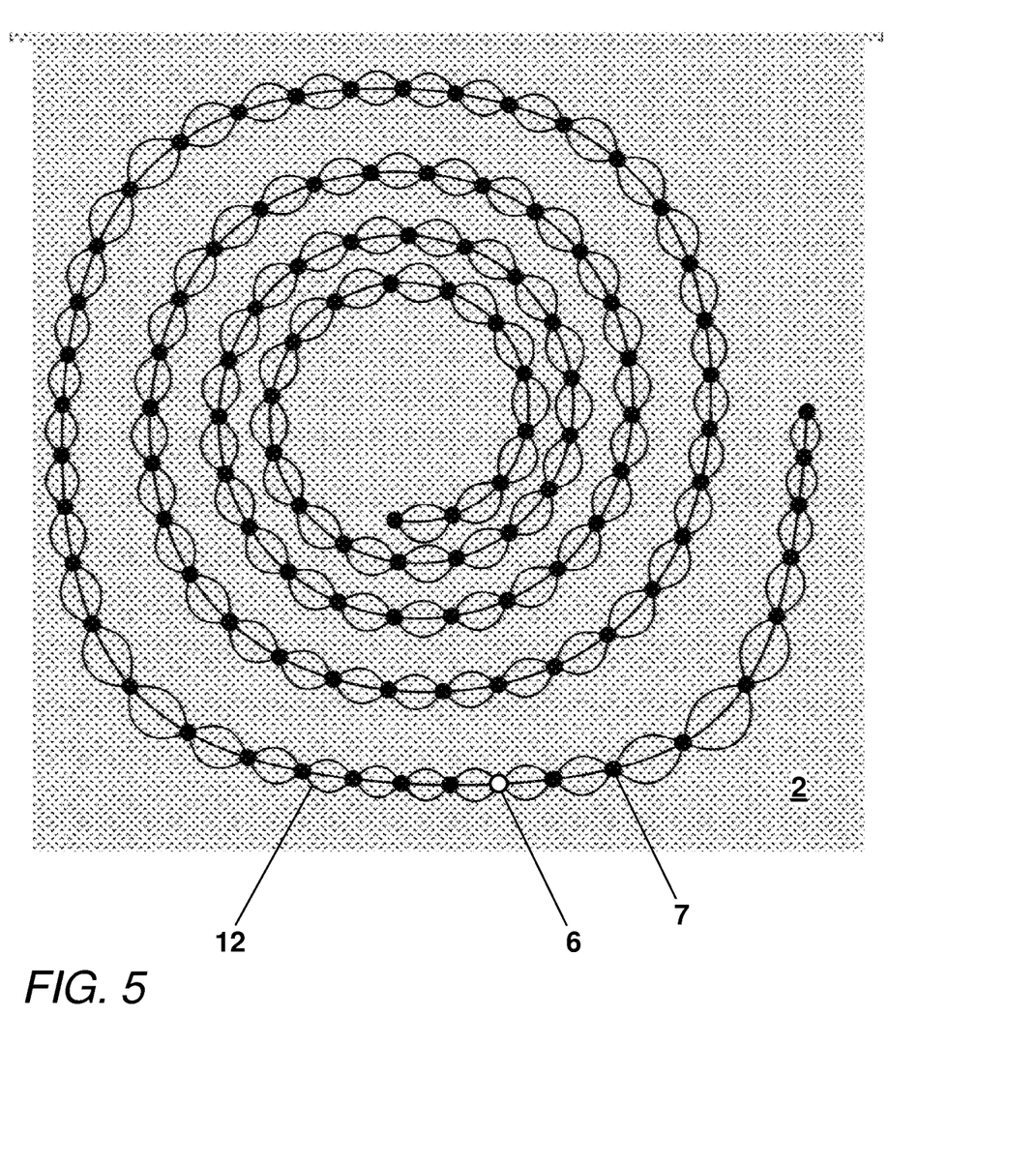
FIG. 5 is a schematic top view of a propagation layer of the optical bus depicting spiral light propagation from a divergence point to convergence at multiple focal points for a square embodiment of the optical bus.

FIG. 5 is a schematic, top view of light propagation in an alternative embodiment of propagation layer 2 having 107 optically-connected, focal points. Analogously, to the embodiments previously depicted, light from any selectable light emission point 6 converges on all remaining 106 focal points 7. As noted above, additional focal point sets emit and receive light simultaneously and independently to the active focal point set depicted with an emitter and a receiver. It should be appreciated that this embodiment does not employ a peripheral mirror.

This lighting configuration is based on Mikaelian's lens [A. L. Mikaelian and A. M. Prokhorov Prog. Opt. 17, 279 (1980)] with an effective refractive index profile given by Equation (6):

$$n_M = n_0 \text{sech}(Y/b)$$

in an {X, Y} plane to be transformed by optical conformal mapping to physical coordinates; b is a scaling parameter and no an arbitrary constant to be determined by the refractive-index range depicted in FIG. 1 This profile is used until $n_M$ drops by ½ from its maximum (until Y=b arcosh2).

With conformal transformations, the strip of Mikaelian's lens defined in Equation (6) is mapped to the substantially spiral shape shown in FIG. 5. The transformations are w=(X+iY)$^a$ with complex a (here a=1+20i), divided by a re-scaling constant R (here R=10) followed by the transformation of Eq. (4).

Using Eq. (5) for the total transformation the effective refractive-index profile of the transformed Mikaelian's lens is calculated; the space between the transformed strip wrapped to a spiral shape is smoothly interpolated. The ray tracing is performed with the method of Eq. (3).

It should be appreciated that many possible light propagation geometries exist that provide optically-connected focal group sets enabling emission at any focal point and light convergence at all remaining focal points.

Furthermore, in a certain embodiment propagation layer 2 is divided by an additional non-propagation layer to form a five-layer planar waveguide. Thickness profile of the two propagation layers is determined by extending the methods described here within as is known to those skilled in the art.

In yet another embodiment, employing only two non-propagation layers, each is implemented with a different refract index from that of each other.

Figure 6:
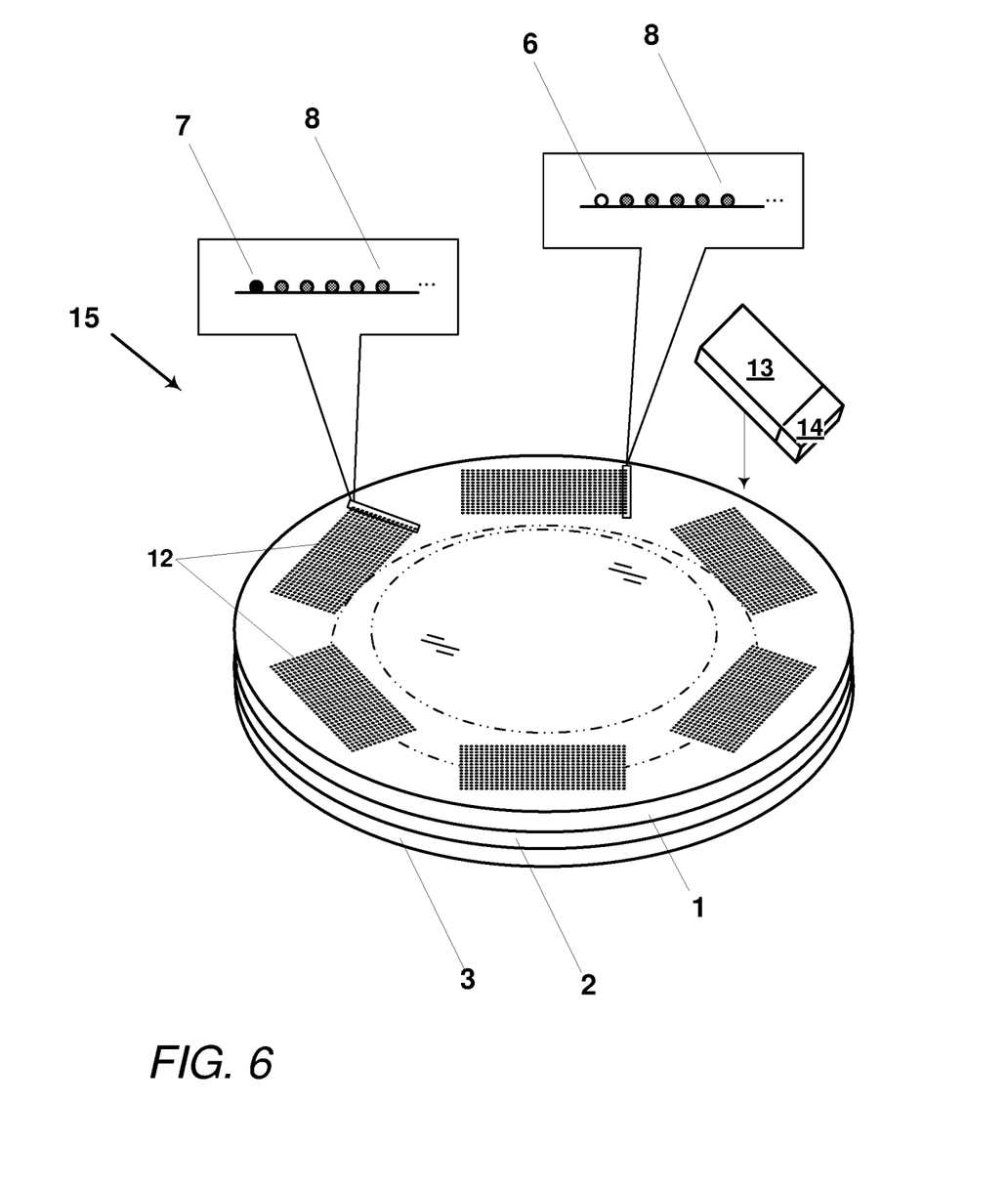
FIG. 6 is a schematic top perspective view of the optical bus depicting illumination port arrays dedicated to multiple cores of a processor, according to an embodiment.

FIG. 6 is a schematic, expanded top-view of the planar wave guide depicted in FIGS. 1-3 implemented as an optical bus 15 and one processor 13, according to an embodiment.

As shown, optical bus 15 optically connects six processor cores 13 (Only one shown for the sake of clarity.) through six illumination port arrays 12; each array dedicated to its respective processor core 13.

Each illumination port of each array 12 is a member of its own port set and is embedded into propagation layer 2 at each focal point or embedded into one of non-propagation layers 1 or 3 and directed to the focal points in propagation layer 2 in another embodiment.

Also for the sake of clarity, only one emitter 6 and one detector 7 are depicted as activated ports. It should be appreciated that inactive ports 8 are only inactive relative to the active ports depicted; emitter 6 and receiver 7. Depicted inactive ports 8 are indeed active as a member of their own respective port set and operate simultaneously with depicted active ports 6 and 7.

Each of the illumination ports of array 12 is implemented as dual-function illumination port that operates either as a light emitter or a light detector depending on the voltaic bias applied, as noted above. When the optically active structure of the illumination port is forward biased, it functions as a LED and when reverse biased, it acts a photodetector.

In a certain embodiment, the optical active structure has a diameter of about 20 μm, in other embodiments the diameter is less than 20 μm. Further details regarding the construction and operation of the illumination ports is found in U.S. Pat. No. 6,410,940, and is hereby incorporated by reference in its entirety.

In certain embodiment, a first set of ports operate at a first wavelength and a second set of ports at a different wavelength.

Biasing is managed by a light management system 14 of switching electronics disposed in one or more of the cores 13, other processing units, or both; depending on the embodiment. Light management system 14 is in communication with processor core circuitry and is operative in accordance with data transmission requirements between the cores. Temporal data is optically transmitted from any one of the illumination ports activated as light emitter 6 and received by corresponding ports activated as photodetectors 7 associated with other cores as guaranteed by the design of propagation layer 2.

Since each array 12 is formed from one illumination port from each respective port set, the number of ports in each array represents the number of discrete, data transmission paths available for optical data transmission The low-high-low index materials for the planar waveguide can be constructed through photolithography and the deposition of the appropriate material as is known in the art. Alternatively, the planar waveguide may be constructed through controlled oxidation in the absence of etching as set forth in the article "Low Loss Etchless Silicon Photonic Waveguides" by J. Cardenas, C. B. Poitras, J. T. Robinson, K. Preston, L. Chen, and Lipson, Opt. Express 17, 4752 (2009) available at https://doi.org/10.1364/OE.17.004752 and is hereby incorporated by reference in its entirety.

The optical bus advantageously increases data transfer rate between cores by a factor of 1000. Furthermore, better connectivity between processor cores can increase computational power, reduce power consumption, and increase battery life of mobile devices.

For example, the power consumption drops by a factor of eight if the core activity increases by a factor of two due to better connectivity, assuming the same computational power. (The activity is the average number of active cores divided by the total number of cores.) This means that the battery of a mobile device lasts nearly 10 times longer. The reason for the dramatic effect on the battery life is that the power consumption depends cubically on the clock speed; distributing a computational task among several cores allows reducing the clock speed and therefore the power consumption by the cube of the increased activity.

It should be appreciated that features described in the context of a particular embodiment also applies to other embodiments set forth in this document.

While certain features of the invention are illustrated and described herein, modifications, substitutions, changes, and equivalents are also included within the scope of the present invention.

What is claimed is:

1. An optical bus for a multi-core processor comprising:
   a planar waveguide providing substantially total internal reflection within a variable-thickness, light-propagation layer sandwiched between two non-propagation layers, the light-propagation layer having a progressively changing effective refractive index in accordance with lateral position within the light-propagation layer;
   a set of illumination ports embedded in the waveguide, the ports distributed so as to focus illumination emanating from any light port of the set onto a plurality of remaining ports of the set; and
   a light management system configured to selectively activate one or more illumination ports of the set as light emitters and simultaneously activate remaining illumination ports of the set as light receivers.

2. The optical bus of claim 1, wherein the light propagation layer is split by a non-propagation layer.

3. The optical bus of claim 1, wherein the plurality of illumination ports is embedded in a non-light propagation layer of the planar waveguide.

4. The optical bus of claim 1, wherein the light management system is implemented in at least one core linked by the optical bus.

5. The optical bus of claim 1, wherein the illumination is implemented at a wavelength within an infrared region of the electromagnetic spectrum.

6. The optical bus of claim 1, wherein each of the two non-propagating layers has a different index of refraction from each other.

7. The optical bus of claim 1, further comprising a peripheral reflector disposed on the planar wave guide.

8. The optical bus of claim 7, wherein the peripheral reflector is implemented as a Bragg reflector.

9. A method of optically transferring data between multiple cores of a processor, the method comprising:
   emitting light from an emitter embedded in a planar waveguide, the emitter in communication with a first processor core;
   directing the light through a variable-thickness, light-propagation layer sandwiched between two non-propagation layers of the planar waveguide, the light-propagation layer having a progressively changing effective refractive index in accordance with lateral position within the light-propagation layer;
   focusing the light onto a plurality of photodetectors embedded in the planar waveguide; each of the plurality of photodetectors in communication with separate processor cores.

10. The method of claim 9, wherein the focusing the light includes reflecting from a reflector.

11. The method of claim 10, wherein the reflector is implemented as Bragg reflector.

12. The method of claim 9, wherein the emitter is implemented as a dual-function illumination port.

13. The method of claim 9, wherein the photodetectors are implemented as dual-function illumination ports.

* * * * *